United States Patent Office 3,200,131
Patented Aug. 10, 1965

3,200,131
HALOGENATED PHOSPHINOPYRANONES
Sheldon B. Greenbaum, Tonawanda, N.Y., assignor to Hooker Chemical Corporation, Niagara Falls, N.Y., a corporation of New York
No Drawing. Filed Jan. 3, 1962, Ser. No. 164,188
9 Claims. (Cl. 260—343.5)

This invention relates to halogenated phosphinopyranones useful as fire-retardant polymer additives in the flameproofing of textile materials, and as organic intermediates and pesticides, and methods for their preparation and fire-retardant use.

More particularly, this invention relates to the compositions which when added to flammable polymerizable monomers impart fire retardancy to the polymerized materials. This class of useful compositions has the structure:

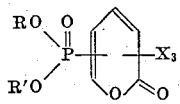

wherein R and R', which may be the same or different, are members selected from the group consisting of alkyl, aryl, alkaryl, alkenyl, cycloalkyl and haloalkyl; and X is halogen, preferably chlorine and bromine.

One of the major disadvantages of polymeric materials which has greatly restricted their use in commerce, particularly in the construction and textile fields, is their high degree of flammability. While there are numerous instances of using additives such as inorganic salts or oxides, i.e., antimony, tin, etc., to impart non-flammability or fire retardance to these materials, they usually have several real drawbacks. For example, they frequently are present in such high proportions in the resin that they substantially add to the cost of production. Secondly, the inorganic salts or oxides weaken the tensile and physical characteristics of the resin, and often impart opaqueness to the resin making its use in the decorative arts difficult and impractical. Lastly, many inorganic fire-retardant additives tend to segregate or migrate after polymerization which, again, weakens the strength and appearance of the polymer and restricts its life and use.

While some organic additives have been found to overcome some of these disadvantages, they generally are required to be present in large amounts, thus causing all of the attendant disadvantages of high cost, lowered tensile strength and opacity. As an illustration of this is the dimer $C_{10}Cl_{12}$ claimed in U.S. 2,724,730, which has been found to be a commercially valuable fire-retardant additive. However, the composition is required to be present from twenty to fifty percent by weight, accompanied by about ten to twenty percent by weight of a metallic salt. While the resultant polymers are remarkably fire-retardant or completely non-burning, the polymers were opaque and white in appearance which, of course, limited their usefulness except where pigmentation offered no disadvantage.

Amongst the polymers in which the compounds of the invention are useful are the homopolymers and copolymers of unsaturated aliphatic, cycloaliphatic and aromatic hydrocarbons, such as polyethylene, polypropylene, polybutene, ethylene/propylene copolymers; copolymers of ethylene or propylene with other olefins, polybutadiene; polymers of butadiene, polyisoprene both natural and synthetic, polystyrene, polyindene, indene-coumarone resins; polymers of acrylate esters and polymers of methacrylate esters. Acrylate and methacrylate resins such as ethyl acrylate, n-butyl methacrylate, isobutyl methacrylate, ethyl methacrylate, and methyl metacrylate; alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resin; furan resins (furfuryl alcohol or furfural-ketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenolformaldehyde, phenolic-elastomer, phenolic-epoxy, phenolic-polyamide, and phenolic-vinyl acetals; polyamide resins such as polyamides and polyamide-epoxy; polyester resins such as polyesters (unsaturated) and polyester-elastomer and polyisobutylene; resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); styrene resins polystyrene); terpene resins; urea resins; vinyl resins such as vinyl acetal, vinyl acetate or vinyl alcohol-acetate, vinyl acetate copolymer, vinyl alcohol, vinyl alkyl ether, vinyl methyl ether-maleic anhydride copolymer, vinyl chloride, vinyl butyral, vinyl chloride-acetate copolymer, vinyl pyrrolidone and vinylidene chloride copolymer, polyformaldehyde, bitumens and asphalts.

The compositions of the instant invention can be mixed into the polymer or its monomer precursor by any one of several methods. For example, the additives can be introduced into the polymer, while the latter is dissolved in a suitable solvent, or into the monomer prior to the polymerization or during the polymerization. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer. Alternatively, the additives and polymer are dry-blended in the finely divided state so that an intimate mixture is obtained upon subsequent molding or extrusion.

The compositions of this invention are desirably incorporated in polymeric materials in the range from about one to about thirty percent by weight of the polymer composition, preferably from about two to about ten by weight.

The compositions of this invention are prepared by the reaction of a perhalocoumalin (tetrahalo α-pyrone or 3,4,5,6-tetrahalo-2H-2-pyranone are alternative names) with an alkyl, aryl or substituted alkyl or aryl phosphite. The perhalocoumalin is prepared according to Canadian Patent 623,279. By substituted alkyl or aryl is meant alkylaryl, alkenylaryl, cycloalkyl and haloalkyl. The general reaction is shown below as if substitution occurred in the 6-position:

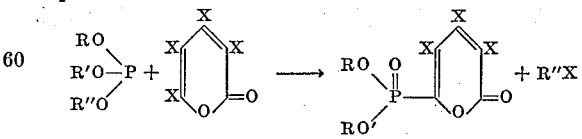

wherein R, R' and R'', which may be the same or different, are selected from the group consisting of alkyl, aryl, substituted aryl and substituted alkyl as defined supra; and X is a halogen preferably chlorine or bromine. Examples of phosphites which, however, are not limiting are as follows:

Alloxymethylethylene phosphite
Cresyl ethylene phosphite
Decyldiphenyl phosphite

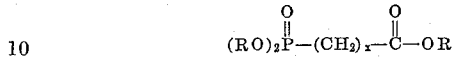

Decylethylene phosphite
Decycloctylene phospite
Diallylphenyl phosphite
Dibutylphenyl phosphite
Didecylphenyl phosphite
Di-iso-butyl phenyl phosphite
Di-iso-butyl ethyl phosphite
Dimethallyl phenyl phosphite
Dioctylphenyl phosphite
Di-n-octyl ethyl phosphite
Diphenyl allyl phosphite
Diphenylmethyl phosphite
Phenyl dodecyl phosphite
Phenylhexylene phosphite
Phenylpropylene phosphite
Tetraphenylethylene diphosphite
Triallyl phospite
Triamyl phosphite
Tributyl phosphite
Tricresyl phosphite
Triethyl phosphite
Triethylene diphosphite
Trihexadecyl phosphite
Tri(isobutylmethyl carbinol)phosphite
Triisobutyl phosphite
Triisooctyl phosphite
Triisopropyl phosphite
Trimethallyl phosphite
Trimethylolethane phosphite
Trimethyl phosphite
Trioctadecyl phosphite
Trioctylphenyl phosphite
Trioctyl phosphite
Tripropyl phosphite
Tris(chloropropyl)phosphite
Tris(2,4-dichlorophenyl)phosphite
Tris(2-ethylhexyl)phosphite
Tris(2-methoxyethoxyethyl)phosphite
Tris(nonyl phenyl)phosphite
Tris(2-phenoxyethyl)phosphite
Tristearyl phosphite
Tristearyl trithiophosphite
Tritetradecyl phosphite
Tritetrahydrofurfuryl phosphite
Tritridecyl phosphite Where a cyclic phosphite is one of the reactants, the R″X does not split off, but the halogan is part of one of the residual alkoxy groups. Examples of phosphites of this type and the products obtained are:

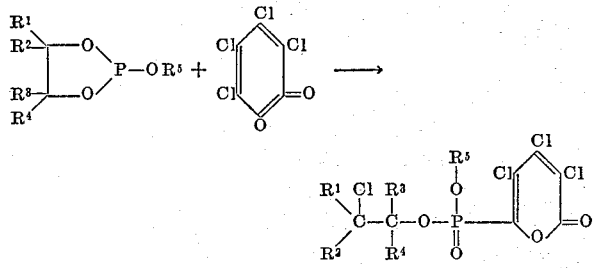

$R^1, R^2, R^3, R^4$ = H, alkyl or alkenyl. $R^5$ = alkyl or aryl.

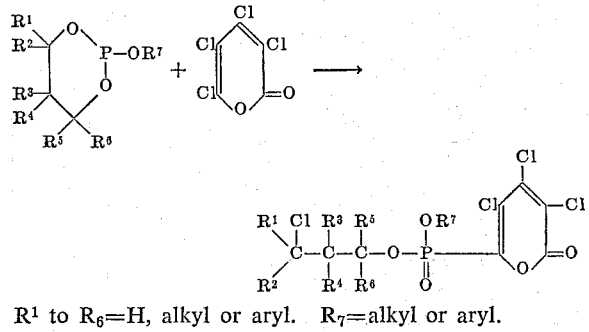

$R^1$ to $R^6$ = H, alkyl or aryl. $R^7$ = alkyl or aryl.

While the structures of these compositions have not been exhaustively investigated, the above given structures appear to be likely.

That this type of compound is formed at all in the inventive process is most surprising in view of the prior art, teaching that lactones react with phosphites to cleave the ring and form open-chain esters of the type $$(RO)_2\overset{O}{\overset{\|}{P}}-(CH_2)_x-\overset{O}{\overset{\|}{C}}-OR$$

without the loss of alkyl halide as in applicant's novel process. Thus, based upon the known synthetic art, the products and process of this invention are both novel and unexpected.

The present inventive process has rather wide limits of reaction conditions at which it is operable. For example, while the use of an inert solvent is generally preferable for reasons of smoothness of reaction and good yield, the solvent may be dispensed with at some loss of yield and lengthening of reaction time. By an inert solvent is meant a solvent boiling between thirty-five degrees centigrade and two hundred degress centigrade, which does not take part in the reaction, and which is not subject to attack by either reactants. Examples of suitable inert solvents are toluene, the xylenes, benzenes, chloro- and nitrobenzenes and the like. The reaction is readily run at temperatures between fifty and two hundred degrees centigrade, preferably at one hundred degrees centigrade to one hundred and fifty degrees centigrade. Lower temperatures, while yielding the desired product, greatly extend the reaction time; while higher temperatures cause decomposition and side-products to be a factor. Ordinarily, atmospheric pressures are utilized, but where sub-atmospheric equipment is available the reaction may be run under high vacuum.

Thus, the preferred process embodiment of this invention is to react a tetrachloro α-pyrone with the appropriately substituted phosphite in the presence of an aromatic or substituted aromatic inert solvent at atmospheric pressures at temperatures ranging from one hundred degrees centigrade to one hundred and fifty degrees centigrade, depending upon the reactants involved for periods of time ranging from one hour to seventy-two hours.

In the course of the reaction of this invention, it is believed that substitution of the phosphorus component occurs in the 6-position of the perhalocoumalin. However, since the structures of the novel compositions have not been exhaustively investigated, the possibility exists that substitution may occur in the 3-, 4- and 5-positions or that a mixture of the substituted products occurs. Hence, I do not wish to be bound by the fact that in the examples I have shown the substitution to be in the 6-position.

EXAMPLE 1

*Preparation of dimethoxyphosphino-trichloro-2H-2-pyranone*

A solution of thirty-two grams of trimethyl phosphite in fifty milliliters of toluene is added drop-wise to a stirred refluxing solution of fifty-eight grams of 3,4,5,6-tetrachloro-2H-pyranone (perchlorocoumalin) prepared according to Canadian Patent 623,279, dissolved in one hundred milliliters of toluene. At the end of six hours of refluxing, an aliquot of the solution no longer decolorizes an iodine in benzene solution, indicating completion of the reaction. The solution is reduced to dryness under vacuum, yielding 88.5 grams of crude product.

Recrystallization from toluene and, then, dilution with methanol gives colorless crystals, melting at eighty-seven to eighty-eight degrees centigrade.

*Analysis.*—Calcd. for $C_7H_6Cl_3O_5P$: Cl, 34.6 percent; P, 10.1 percent. Found: Cl, 34.6 percent; P, 10.1 percent.

The compound is believed to be 6-dimethoxyphosphino-3,4,5-trichloro-2H-2-pyranone.

The utility of the compositions of this invention as fire-retardant additives is established in accordance with standard ASTM D-635-56T test procedures as follows:

In this test, the sample to be tested is positioned horizontally three-eighths of an inch above a wire gauze and ignited for thirty seconds with a Bunsen burner. For samples which burn, the burning rate is determined between marks one and four inches from the end of the specimen. For self-extinguishing materials, the time to self-extinguishment (excluding the ignition period) is reported since the total distance burned is generally arrived at during the ignition period. In the case of self-extinguishing specimens, multiple tests (about four to six) were carried out on a single five-inch bar by repeatedly removing the charred part of the bar after each determination and retesting the newly exposed section.

TABLE I.—FLAMMABILITY OF POLYPROPYLENE CONTAINING VARIOUS ADDITIVES

| Percent Product of Example 1 | Percent $C_{10}Cl_{12}$ | Self-extinguishing time (seconds) | Burning rate inches/seconds |
|---|---|---|---|
| ---- | 10 | (¹) | 0.6 |
| ---- | 35 | 37-68 | ---- |
| 5 | ---- | 14.0 | ---- |
| 10 | ---- | 4.8 | ---- |

¹ Not self-extinguishing.

EXAMPLE 2

*Preparation of [bis(1-chloro-2-propoxy)]phosphinotrichloro-2H-2-pyranone*

A solution of 79.4 grams of tris(1-chloro-2-propyl) phosphite in thirty milliliters of toluene is added dropwise to a stirred refluxing solution of fifty-eight grams of perchlorocoumaline as described in Example 1. The reaction mixture is brought to dryness and recrystallized from methanol by adding water. A crystalline product melting at eighty-three degrees centigrade is obtained.

*Analysis.*—Calcd. for $C_{11}H_6Cl_5O_5P$: Cl, 41.4 percent; P, 7.3 percent. Found: Cl, 41.6 percent; P, 7.5 percent.

The compound is believed to be 6-[bis-(1-chloro-2-propoxy)]phosphino-3,4,5-trichloro-2H-2-pyranone.

EXAMPLE 3

*Preparation of additional phosphinopyranone compositions*

Using the procedure described in Examples 1 and 2, and substituting the indicated phosphite for the trimethyl phosphite, the following compositions are prepared as shown in Table II which follows.

bility by the method of ASTM D-635-58T described earlier.

TABLE III
[ASTM D-635-58T]

| Composition (parts by weight) | | Results |
|---|---|---|
| Product of Example 1 | Styrene | |
| 1 | 14 | Instant extinguishing-non-burning. |
| 1 | 19 | Do. |
| 1 | 39 | Slow burning. |
| Celluflex FR2 (tris-2,3-dichloropropyl phosphate): | | |
| 1 | 19 | Slow extinguishing. |
| 1 | 39 | Slow burning. |

While my invention has been described with reference to certain specific embodiments, it will be recognized by those skilled in the art that many variations are possible without departing from the spirit and scope of the invention.

I claim:

1. A compound of the formula:

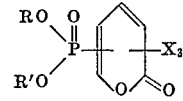

wherein R and R' are independently selected from the group consisting of alkyl, aryl, alkaryl, alkenyl, cycloalkyl and haloalkyl, said substituents containing from 1 to 18 carbon atoms; and X is a halogen.

2. Dimethoxyphosphinotrichloro-2H-2-pyranone.
3. Diethoxyphosphinotrichloro-2H-2-pyranone.
4. [Bis(1-bromo-2-propoxy)]phosphinotrichloro-2H-2-pyranone.
5. (2-chloroethoxy) phenoxyphosphinotrichloro-2H-2-pyranone.
6. Diallyloxyphosphinotrichloro-2H-2-pyranone.
7. (3-chloro-1-propoxy) phenylphosphinotrichloro-2H-2-pyranone.
8. The process of reacting a substituted phosphite of the structure:

wherein R and R' are independently selected from the group consisting of alkyl, aryl, alkaryl, alkenyl, cycloalkyl and haloalkyl and when taken together alkylene, said substituents containing from 1 to 18 carbon atoms; and R" is selected from the group consisting of alkyl, aryl, alkaryl, alkenyl, cycloalkyl and haloalkyl, said substitu-

TABLE II

| Example No. | Phosphite and weight used | Product ¹ | Form | Empirical formula | Analysis | | | |
|---|---|---|---|---|---|---|---|---|
| | | | | | Calcd. | | Found | |
| | | | | | Cl | P | Cl | P |
| 3 | Trisbromopropyl (174 g.) | [Bis(1-bromo-2-propoxy)]phosphinotrichloro-2H-2-pyranone. | Oil | $C_{11}H_{12}Br_2Cl_3O_5P$ | 20.4 | 5.9 | 20.8 | 5.7 |
| 4 | Phenyl ethylene (184 g.) | (2-chloroethyloxy) phenoxy phosphinotrichloro-2H-2-pyranone. | Oil | $C_{13}H_9Cl_4O_5P$ | 34.0 | 7.4 | 33.8 | 7.1 |
| 5 | Triallyl (48.3 g.) ² | Diallyloxyphosphinotrichloro-2H-2-pyranone | Oil | $C_{11}H_{10}Cl_3O_5P$ | 29.6 | 8.6 | 29.9 | 8.7 |

¹ Substitution is believed to have occurred in the 6-position.  ² (+0.5 g. hydroquinone).

EXAMPLE 6

*Fire retardant tests with styrene monomers*

Mixtures of styrene monmer and the product of Example 1 are made into coatings by polymerization at eighty degrees centrigrade in the presence of one percent benzoyl peroxide. The castings are tested for flammability ents containing from 1 to 18 carbon atoms with a 3,4,5,6-tetrahalo-2H-2-pyranone of the structure:

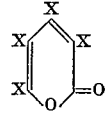

wherein X is halogen in a solvent at a temperature from about 50 to about 200 degrees centrigrade.

9. The process of claim 8 wherein R, R' and R" are methyl and X is chlorine.

References Cited by the Examiner
UNITED STATES PATENTS 2,525,155 10/50 Thynne _____ 106—16
3,014,925 12/61 Linn et al. _____ 260—343.5

FOREIGN PATENTS 184,580 2/56 Austria.

OTHER REFERENCES

Kosolapoff: Organophosphorus Compounds, Wiley, Inc., New York (1950), pages 121 and 122.

WALTER A. MODANCE, *Primary Examiner.*

UNITED STATES PATENT OFFICE
CERTIFICATE OF CORRECTION

Patent No. 3,200,131                              August 10, 1965

Sheldon B. Greenbaum

It is hereby certified that error appears in the above numbered patent requiring correction and that the said Letters Patent should read as corrected below.

Column 1, line 71, for "metacrylate" read -- methacrylate --; column 2, line 20, for "poly-" read -- (poly- --; line 70, for "Alloxymethylethylene phosphite" read -- Allyloxymethyl ethylene phosphite --; line 72, for "Decyldiphenyl phosphite" read -- Decyl diphenyl phosphite --; column 3, line 1, for "Decylethylene phosphite" read -- Decyl ethylene phosphite --; line 2, for "Decycloctylene phospite" read -- Decyl octylene phosphite --; line 3, for "Diallylphenyl phosphite" read -- Diallyl phenyl phosphite --; line 4, for "Dibutylphenyl phosphite" read -- Dibutyl phenyl phosphite --; line 5, for "Didecylphenyl phosphite" read -- Didecyl phenyl phosphite --; line 9, for "Dioctylphenyl phosphite" read -- Dioctyl phenyl phosphite --; line 12, for "Diphenylmethyl phosphite" read -- Diphenyl methyl phosphite --; line 14, for "Phenylhexylene phosphite" read -- Phenyl hexylene phosphite --; line 15, for "Phenylpropylene phosphite" read -- Phenyl propylene phosphite --; same column 3, line 16, for "Tetraphenylethylene diphosphite" read -- Tetraphenyl ethylene diphosphite --; column 5, line 38, for "perchlorocoumaline" read -- perchlorocoumalin --.

Signed and sealed this 17th day of May 1966.

(SEAL)
Attest:

ERNEST W. SWIDER
Attesting Officer
                                         EDWARD J. BRENNER
                                         Commissioner of Patents